United States Patent
Fellenstein et al.

(10) Patent No.: US 7,092,724 B2
(45) Date of Patent: Aug. 15, 2006

(54) METHOD AND APPARATUS FOR WAYPOINT SERVICES NAVIGATIONAL SYSTEM

(75) Inventors: Craig William Fellenstein, Brookfield, CT (US); Carl Phillip Gusler, Austin, TX (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/171,852

(22) Filed: Jun. 13, 2002

(65) Prior Publication Data

US 2004/0203860 A1    Oct. 14, 2004

(51) Int. Cl.
*H04Q 7/20* (2006.01)
*G01C 21/26* (2006.01)
*G08G 1/09* (2006.01)

(52) U.S. Cl. .................. 455/456.3; 455/456.1; 455/456.2; 701/200; 340/905

(58) Field of Classification Search ............. 455/456.3, 455/456.1, 456.2, 457, 414.1; 701/200, 201; 340/905
See application file for complete search history.

(56) References Cited

U.S. PATENT DOCUMENTS

| | | | |
|---|---|---|---|
| 5,948,040 A | 9/1999 | DeLorme et al. | 701/201 |
| 6,014,090 A * | 1/2000 | Rosen et al. | 340/905 |
| 6,141,010 A | 10/2000 | Hoyle | |
| 6,202,023 B1 * | 3/2001 | Hancock et al. | 701/201 |
| 6,281,811 B1 | 8/2001 | Ranzino | 340/988 |
| 6,332,127 B1 | 12/2001 | Bandera et al. | 705/14 |

(Continued)

FOREIGN PATENT DOCUMENTS

WO    WO 99/55066    10/1999

OTHER PUBLICATIONS

Claria found at http://www.claria.com/companyinfo/.

*Primary Examiner*—George Eng
*Assistant Examiner*—Kiet Doan
(74) *Attorney, Agent, or Firm*—David A. Mims, Jr.; Rudolf O. Siegesmund (57) ABSTRACT

A Waypoint Services Navigational System (WSNS) is disclosed comprising a mobile unit connected to a server and to a database by the Internet. The WSNS uses omnipresent digital cellular links or any other form of radio frequency communications for transmission of information by a registered services provider to a traveler with a WSNS mobile unit. Using WSNS, the registered service provider announces its presence along with specific services/products to a traveler with a WSNS mobile unit within a predefined geographic radius. This information may be viewed via a conventional mobile computer, a personal digital assistant screen, or through a Global Positioning System (GPS) mapping longitude/latitude device. The WSNS mobile unit may be portable or mounted in a vehicle in a convenient location. Specific directions to a selected services provider are provided based upon the proximity positioning information at that moment in-time when the information is requested. Advertising specials, competitive services/products, entertainment, or emergency services may all be broadcast, and the user may choose from menus for the nature of services desired. Information may be provided regarding "upcoming" service providers through a combination of user geographical location, user directional data, and overlay maps showing registered businesses. Products or services may be ordered through a WSNS online order system for placing credit-or account backed purchases using the WSNS combination of locational information and business registration. WSNS service may also be provided through conventional internet-only communications, downloadable into a GPS-attached mobile computer to alleviate the need for a cellular link to the car.

21 Claims, 7 Drawing Sheets

U.S. PATENT DOCUMENTS

| | | | |
|---|---|---|---|
| 6,353,743 B1 | 3/2002 | Karmel | 455/456 |
| 6,618,594 B1 * | 9/2003 | Myers et al. | 455/457 |
| 6,650,902 B1 * | 11/2003 | Richton | 455/456.3 |
| 6,772,213 B1 * | 8/2004 | Glorikian | 709/228 |
| 6,785,551 B1 * | 8/2004 | Richard | 455/456.1 |
| 6,813,501 B1 * | 11/2004 | Kinnunen et al. | 455/456.2 |
| 2001/0019960 A1 * | 9/2001 | Takayama et al. | 455/456 |
| 2002/0046084 A1 | 4/2002 | Steele | |
| 2002/0099606 A1 * | 7/2002 | Shlagman | 705/14 |
| 2002/0107027 A1 * | 8/2002 | O'Neil | 455/456 |

* cited by examiner

METHOD AND APPARATUS FOR WAYPOINT SERVICES NAVIGATIONAL SYSTEM

FIELD OF THE INVENTION

This invention relates generally to data processing and providing information and services to a user based upon the user' position as determined by a navigational system.

BACKGROUND OF THE INVENTION

In today's world of ever-increasing travel and mobile computing, and with a multitude of news, products and services catering to the mobile public, it is still a difficult proposition to locate providers of various goods and services while traveling. A need arises for a way to rapidly discover service and product providers while traveling. A further need arises for a way for businesses, including but not limited to restaurants, gas stations, and retail stores, to register their offerings and locations with a central service provider for exposure and advertising to mobile travelers within a preset geographic distance. Once registered, any mobile person would then be able to be guided to the chosen place of business, once in a general proximity of the Selected place of business. The need includes providing the mobile traveler wit both navigational instructions to the registered business and providing information on specific services/products available from the registered business. A further need exists for a way for proactive advertising and discounted specials (i.e., "electronic coupons") of the registered businesses to be provided directly to the mobile traveler.

SUMMARY OF THE INVENTION

The invention that meets the needs identified above is a Waypoint Services Navigational System (WSNS) comprising a mobile unit connected to a server and to a database by the Internet. The WSNS uses omnipresent digital cellular links or any other form of radio frequency communications for transmission of information by a registered services provider to a traveler with a WSNS mobile unit. Using WSNS, the registered service provider announces its presence along with specific services/products to a traveler with a WSNS mobile unit within a predefined geographic radius. This information may be viewed via a conventional mobile computer, a personal digital assistant screen, or through a Global Positioning System (GPS) mapping longitude/latitude device. The WSNS mobile unit may be portable or mounted in a vehicle in a convenient location. Specific directions to a selected services provider are provided based upon the proximity positioning information at that moment in-time when the information is requested. Advertising specials, competitive services/products, entertainment, or emergency services may all be broadcast, and the user may choose from menus for the nature of services desired. Information may be provided regarding "upcoming" service providers through a combination of user geographical location, user directional data, and overlay maps showing registered businesses. Products or services may be ordered through a WSNS online order system for placing credit-or account backed purchases using the WSNS combination of locational information and business registration. WSNS service may also be provided through conventional internet-only communications, downloadable into a GPS-attached mobile computer to alleviate the need for a cellular link to the car.

DETAILED DESCRIPTION OF THE PREFERRED EMBODIMENT

As used herein, $Radius_{immediate}$ shall mean and be numerically equal to the number of miles/kilometers around a vehicle for which to display businesses as being optimal for stopping.

As used herein, $ForwardDistance_{immediate}$ shall mean and be numerically equal to the forward distance before a vehicle, given the current direction of driving, for which to display optimal businesses.

As used herein, LateralDistance shall mean the perpendicular distance away from the highway at the point where ForwardDistance is calculated, and may be factored in either absolute terms, or via a suitable trigonometrical function. For example, if a business requires five miles forward and one mile lateral movement, it may or may not be considered "forward." Similarly, if reaching a business requires one mile forward and five mile lateral movement, it may or may not be considered "forward." Again, this will depend on lateral or angular permissiveness, contingent on implementation principles.

As used herein, $Radius_{available}$ means and is numerically equal to the number of miles/kilometers greater than $Radius_{immediate}$ that is around the vehicle in which WSNS will display businesses as being available for stopping.

As used herein, $ForwardDistance_{available}$ means and is numerically equal to the Forward Distance, greater than $ForwardDistance_{immediate}$ that is before the vehicle, given current direction of driving, for which to display available businesses. Trigonometric or absolute lateral permissiveness factors will apply depending upon implementation design parameters.

As used herein, the term "target business" shall mean a business that has registered with the Waypoint Services Navigational System service provider so that information can be provided to travelers, orders placed and orders received through the Waypoint Services Navigational System service provider.

As used herein, the term Geographic Information Systems (GIS) table, means a list compiled by the WSNS server of all available businesses within a specified distance of the mobile user, based upon prior business registration information. The resultant list of compiled businesses will be displayed, by category, within the car, possibly but not necessarily on a dashboard display. Speech synthesis or recording of business names and distances from current location may also be used for compilation and presentation and may be either $Radius_{immediate}$ $ForwardDistance_{immediate}$ $Radius_{available}$ or $ForwardDistance_{available}$ Furthermore, the WSNS may present an ordered list, in ascending or descending order, of business by distance. Likewise, it is possible for the WSNS to present the list in gradients, either as two degrees of desirability as outlined here (i.e., "immediate" and "available") or in even greater degrees of desirability.

Figure 1:
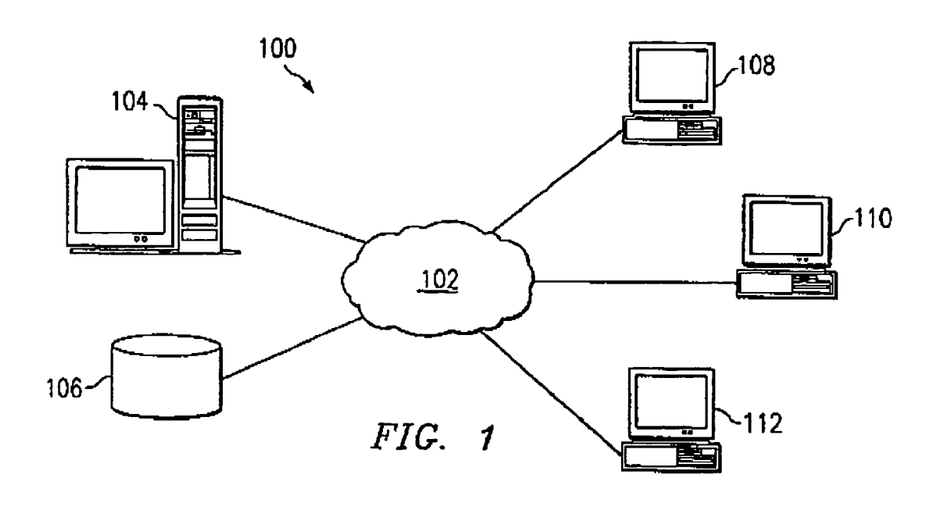
FIG. 1 is an illustration of a distributed data network.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
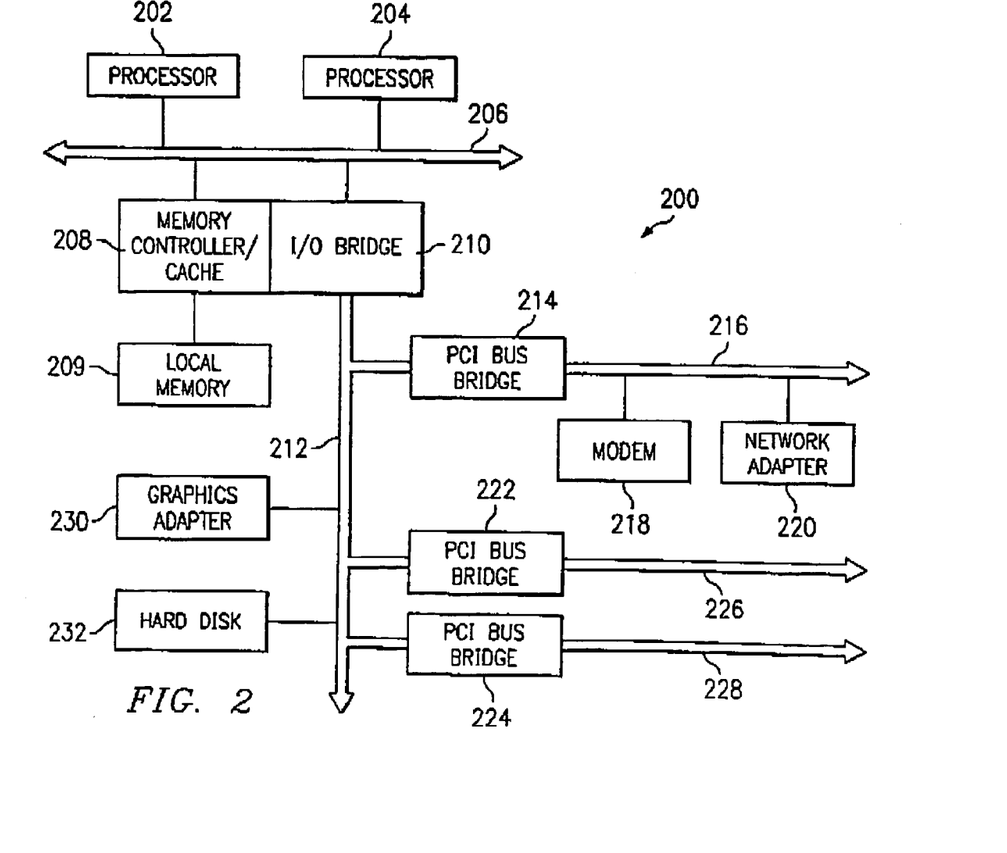
FIG. 2 is an illustration of a data processing system.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI bus local 216. Typical PCI bus implementations will support four PCI expansion slots or add-in connectors. Communications links to network computers 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
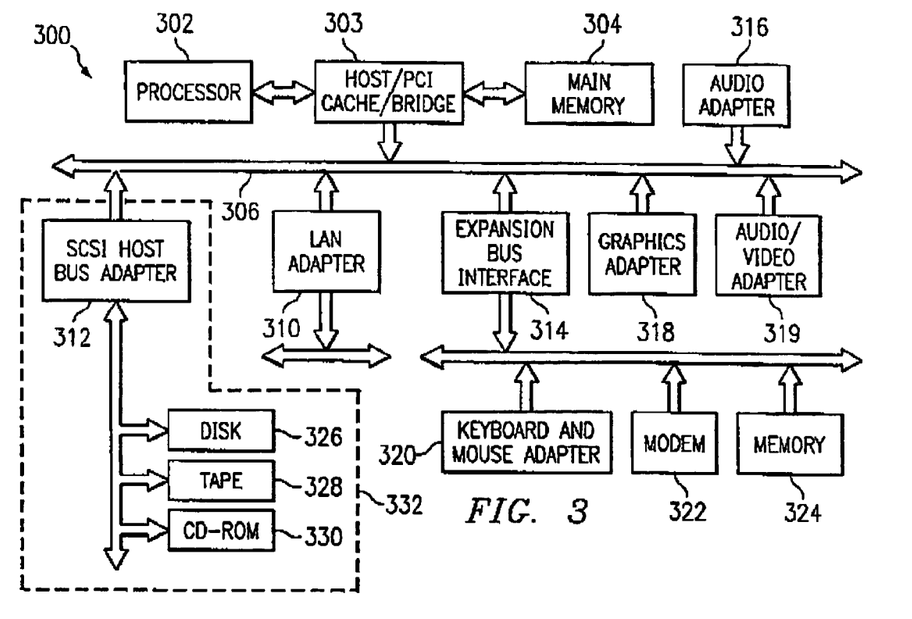
FIG. 3 is an illustration of a data processing system.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
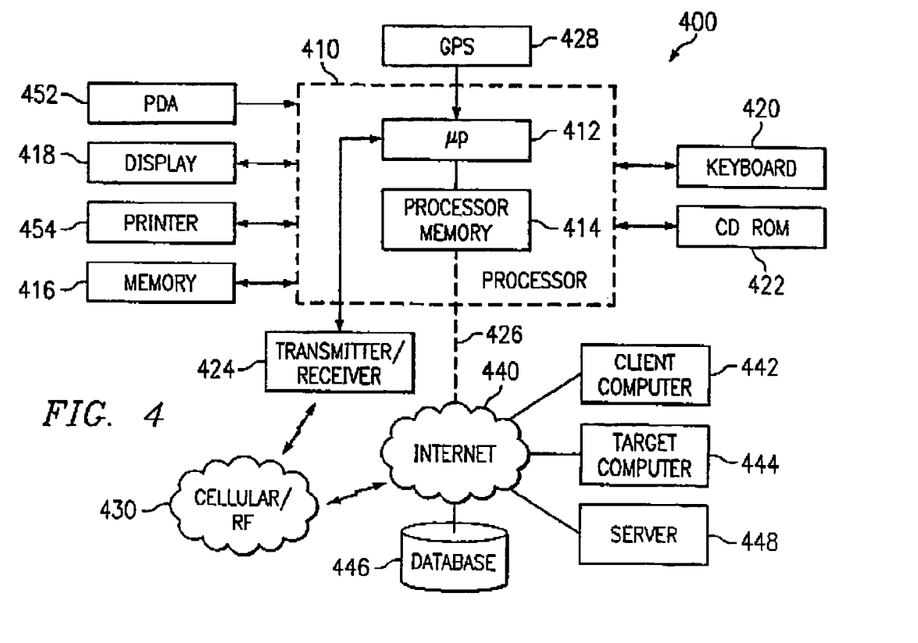
FIG. 4 is an illustration of the WSNS system.

FIG. 4 is an illustration of WSNS system 400. WSNS mobile unit 410 comprises microprocessor 412 connected to a processor memory 414. WSNS mobile unit 410 may be configured for vehicle installation or stand alone use by connecting 410 to one or more of the following: memory 416, display 418, CD-Rom 422, keyboard 420, transmitter/receiver 424, global positioning system 428, personal digital assistant (PDA) 452 and printer 454. In the preferred embodiment, display 418 is a "heads up display" that will project the data from WSNS system 400 onto the inside of the windshield of the automobile (not shown) in which WSNS mobile unit 410 is installed. The "heads up display" allows the driver to access data from WSNS system 400 without turning his vision away from the direction of travel. Alternatively, display unit 418 may be any type of suitable display known to persons skilled in the art. Also in the preferred embodiment, mobile unit 410 is connected by transmitter/receiver 424 to cellular/RF communications network 430 and cellular/RF network 430 is connected to Internet 440. Client computer 442, target business computer 444, database 446 and server 448 are illustrative of the hardware that mobile unit 410 communicates with via the Internet.

Figure 5:
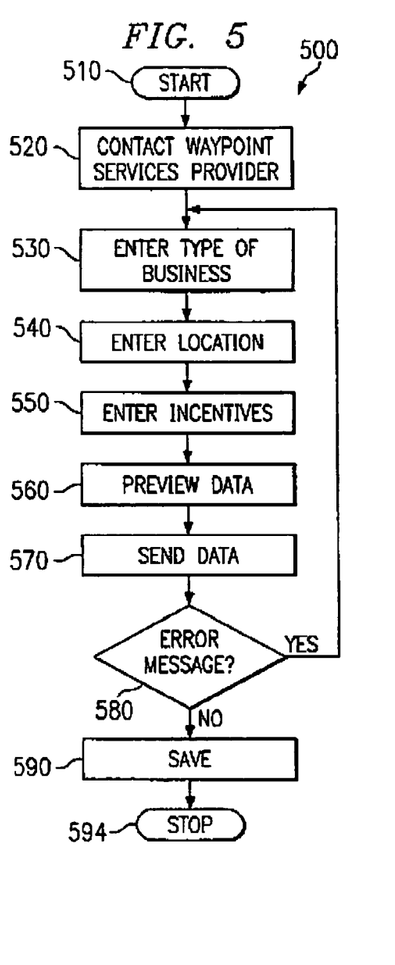
FIG. 5 is a flow chart of the target business registration process.

FIG. 5 depicts a flow chart of target business registration process 500. A target business may sign up with the WSNS service provider through a variety of moans including but not limited to telephone or the internet. Depending on the business model followed, a cost may or may not be incurred by the business registering with the service. Additionally, advantages exist for chambers of commerce and other such business promotion entities, to promote local ventures by mass-registering the proprietors within their jurisdiction. Target business registration process 500 begins (510) and the target business contacts WSNS service provider (520). The target business enters the type of business in which the target business is engaged (530). Examples of the type of business may include without limitation one or more of the following: lodging, fuel, or food. The target business enters its location (540). If the target business has any incentives that it may want to offer, these can be entered (550), Incentives include without limitation discounts or electronic coupons. The user at the target business reviews the entered data to check for accuracy and completeness (560) and sends the data to the WSNS service provider (570). If an error message is received (580), target business registration process 500 goes to step 530 to check and re-enter data, If an error message is not received, target business registration process 500 saves the information (580590) and stops (594). Persons skilled in the art will recognize the interchangeability of steps for the entry of data in FIG. 5.

Figure 6:
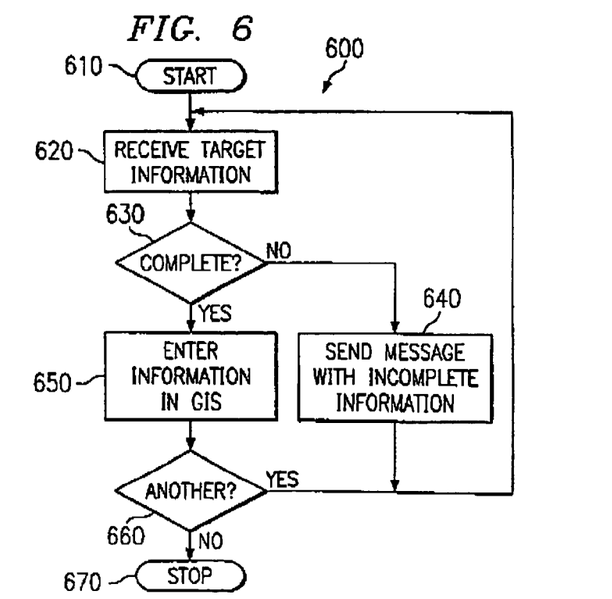
FIG. 6 is a flow chart of the WSNS server registration process.

FIG. 6 is a flow chart of the WSNS server registration process. Server registration process 600 begins (610) and target business information submitted by target business registration process 500 is received (620). A determination is made as to whether the information received is complete (630). If the information is not complete, an error message describing the incomplete information is sent to the target business (640) and server registration process 600 goes to step 620. If the information is complete, server registration process 600 enters the target business information in a Geographic Information Systems (GIS) table (650). A determination is made as to whether there is another target business to process (660). If there is another target business, server process 600 goes to step 620 and if not ends (670).

Figure 7A:
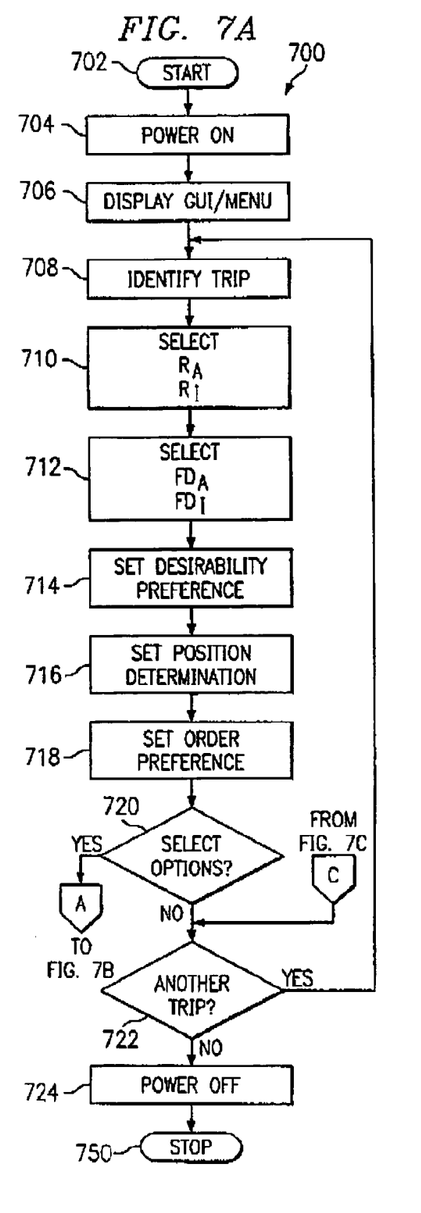
FIG. 7A is a flow chart of the WSNS user set up process.

FIG. 7A is a flow chart of the WSNS user interface set up process. Set up process 700 begins (702) and the user turns the power on for mobile unit 410 (see FIG. 4). A user driving on a given road, with the WSNS available, will switch on the system. In the preferred embodiment, mobile unit 410 will be installed in a vehicle but may also be handheld carried by a pedestrian. Upon power-on (704), or other initiation of active engagement, the mobile unit 410 will use existing technology to register location and directional information with a WSNS central server. The existing technology includes without limitation the Global Positioning System (GPS). The granularity of position resolution may be sub-mile which may be achieved with current methodologies. A desirable resolution will be within several meters, consistent with current technologies. Mobile unit 410 displays a graphical user interface/menu to guide the user through the set up process (706). The user identifies the trip for which data will be entered (708). The user selects either $Radius_{immediate}$ or $Radius_{available}$ (710). Next, the user selects either $ForwardDistance_{immediate}$ or $ForwardDistance_{available}$ (712). The user sets desirability preferences, if different from those selected in step 710 and 712 (714). Next the user sets the position determination preference (716). The user sets order preferences (718). A determination is made as to whether the user wants to select options (720). If the user does not want to select options, then a determination is made as to whether parameters and preferences for another trip are to be entered (722). If another trip is not to be entered, power is turned off (724) and set up process 700 ends (750). If another trip is to be entered, set up process 700 goes to step 708.

Figure 7B:
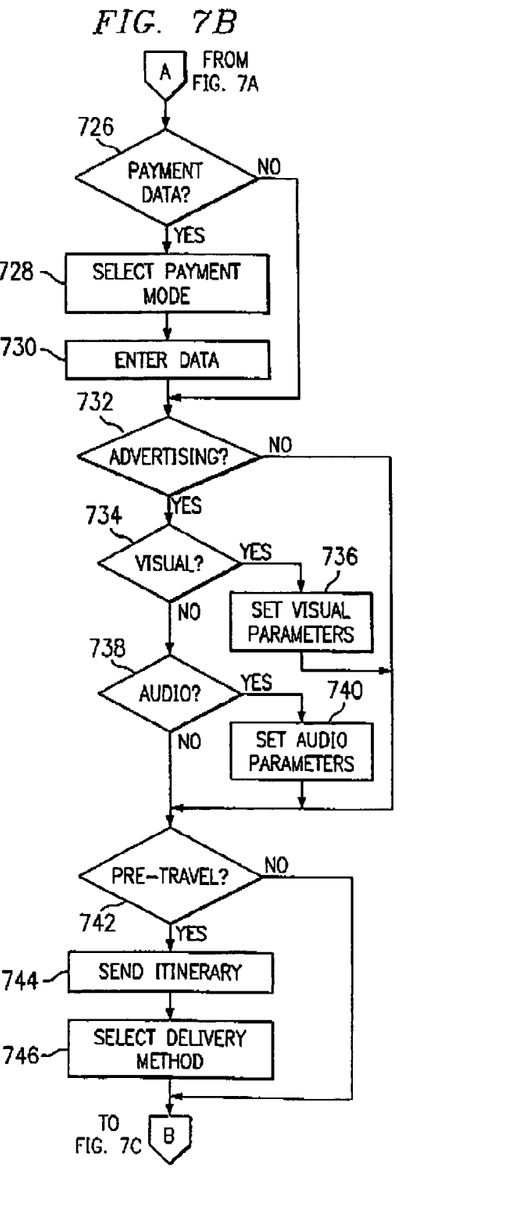
FIG. 7B is a continuation flow chart of the WSNS user set up process.

Referring to FIG. 7B, if at step 720, a determination is made that the user wants to select options, then a determination is made as to whether the user wants to enter payment data (726). If the user wants to enter payment data, the user selects payment mode (728), enters the payment data (730)

and set up process 700 goes to step 732. If the user does not want to enter payment data, a determination is made as to whether the user wants to receive advertising (732). Advertising may be desirable for the following reasons. If the user chooses to leave his or her mobile unit powered on for any length of time (a likely possibility, resulting in a continuous stream of updates to the mobile unit), it may be advantageous to allow and to even encourage onboard advertising. In this implementation, a user may have upcoming businesses displayed in any of the previously mentioned formats, while a separate portion of the screen (or intermittent voice-delivered messages over the WSNS link) will offer words of advertisement and/or special promotions to the user. It is further possible that the user will have "WSNS-only" promotions available, through which he or she can receive reduced rates and prices at local businesses. If the user wants to receive advertising, a determination is made as to whether the user wants to receive visual advertising (734). If the user wants to receive visual advertising, the user sets visual parameters (736). If the user does not want to receive visual advertising, a determination is made as to whether the user wants to receive audio advertising (738). If the user wants to receive audio advertising, the user sets audio parameters (740). A determination is made as to whether the user wants to receive pre-travel information (742). If the user wants to receive pre-travel information, the user sends the itinerary for which the pre-travel information is desired (744) and selects a method of delivery for the pre-travel information (746).

The user's credit card number (or analogous account information) may be stored on the WSNS mobile unit (including memory sticks) and broadcast to the service provider when goods or services are desired, or it could be stored in a local trusted server, for conveyance to the business when stipulated by the user. For example, the mobile user may select an item via either keyboard, touch-sensitive screen, or via speech queues, to the WSNS options displayed on his or her mobile unit. This Information is conveyed back to the WSNS provider via RF links (possibly, but not necessarily, through cellular telephone/personal communications systems frequencies). The WSNS provider provides the information to the target business through one of several means. These means may include human intervention via telephone, fax machine, email or other electronic communications. The credit card number or account information will be provided to the target business, so that food will, be prepared, rooms will be held, et cetera, based upon the financial backing for the order being placed.

Figure 7C:
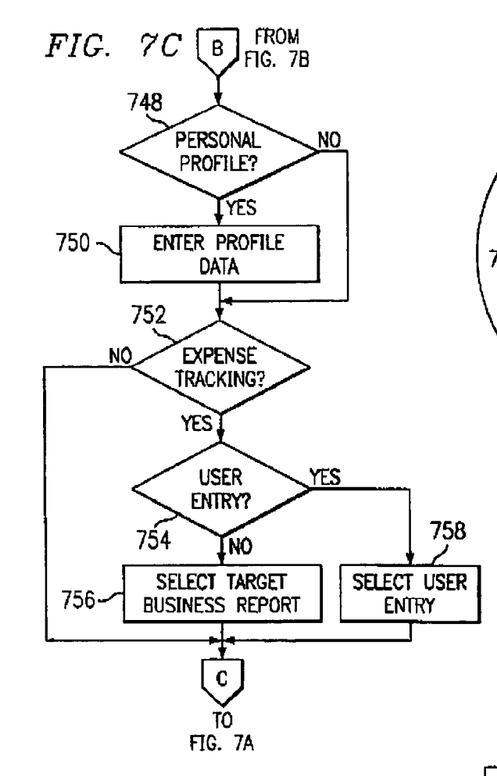
FIG. 7C is a continuation flow chart of the WSNS user set up process.

Referring to FIG. 7C, set up process 700 continues and the user determines whether or not to utilize personal profile information (748). The personal profile information may be used by the WSNS server to identify target businesses with products and services that meet the particular needs of the user's profile. For example, such general items as age, educational background, and interest items may be entered as well as specific items such as brand preferences for particular food, lodging, gasoline or automotive products. If the user desires to use the personal profile option, then the user enters profile data to be used by the WSNS server (750) and set up process 700 goes to step 752. If the user does not want to use the personal profile option, then the user makes a determination as to whether the expense tracking option is desired. The expense tracking option allows the user to receive a summary of trip expenses where the expenses are incurred from the WSNS target businesses. If the expense tracking is desired, then the user chooses whether or not the user will enter expense data into the system during the trip (754). If the user does not want to enter data, the user will select a target business report option (756) and transaction information will be gathered by the WSNS server from the target business when a transaction is made. If the user decides to enter the data, the user entry is selected (758). For user entry to be accomplished, the user will have to have hardware to scan in receipts, or alternatively a keyboard, touchscreen, or voice recognition capability to transmit the transaction data from the WSNS mobile unit 410 for summarization and reporting by the WSNS server at the conclusion of the trip. Set up process 700 then goes to step 722. Persons skilled in the art will recognize the interchangeability of steps for the entry of data, preferences or for the selection of options in FIGS. 7A through 7C.

Figure 7D:
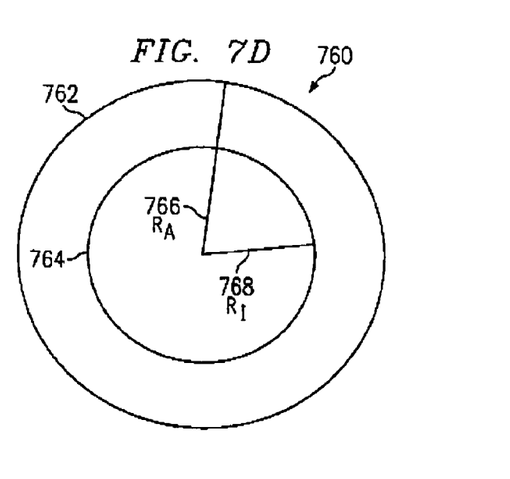
FIG. 7D depicts the relationship of the available and immediate radii used by WSNS.

FIG. 7D depicts the relationship of the available and immediate radii used by WSNS. $Radius_{immediate}$ 766 establishes a first circle 764 that is smaller than a second circle 762 established by $Radius_{available}$ 766.

Figure 7E:
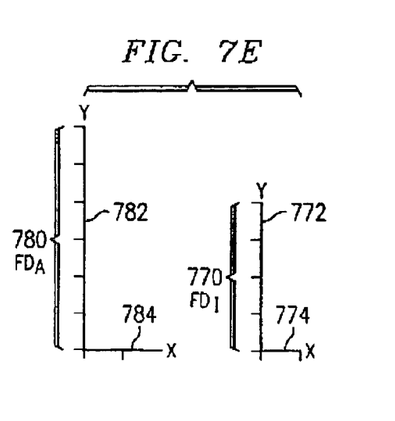
FIG. 7E depicts the available and immediate forward distance parameters used by WSNS.

FIG. 7E depicts the available and immediate forward distance parameters used by WSNS. $ForwardDistance_{immediate}$ 770 is smaller than $ForwardDistance_{available}$ 782 $ForwardDistance_{immediate}$ 770 has LateralDistance 774 and ForwardDistanceavailable 780 has LateralDistance 784.

Figures 8, 10:
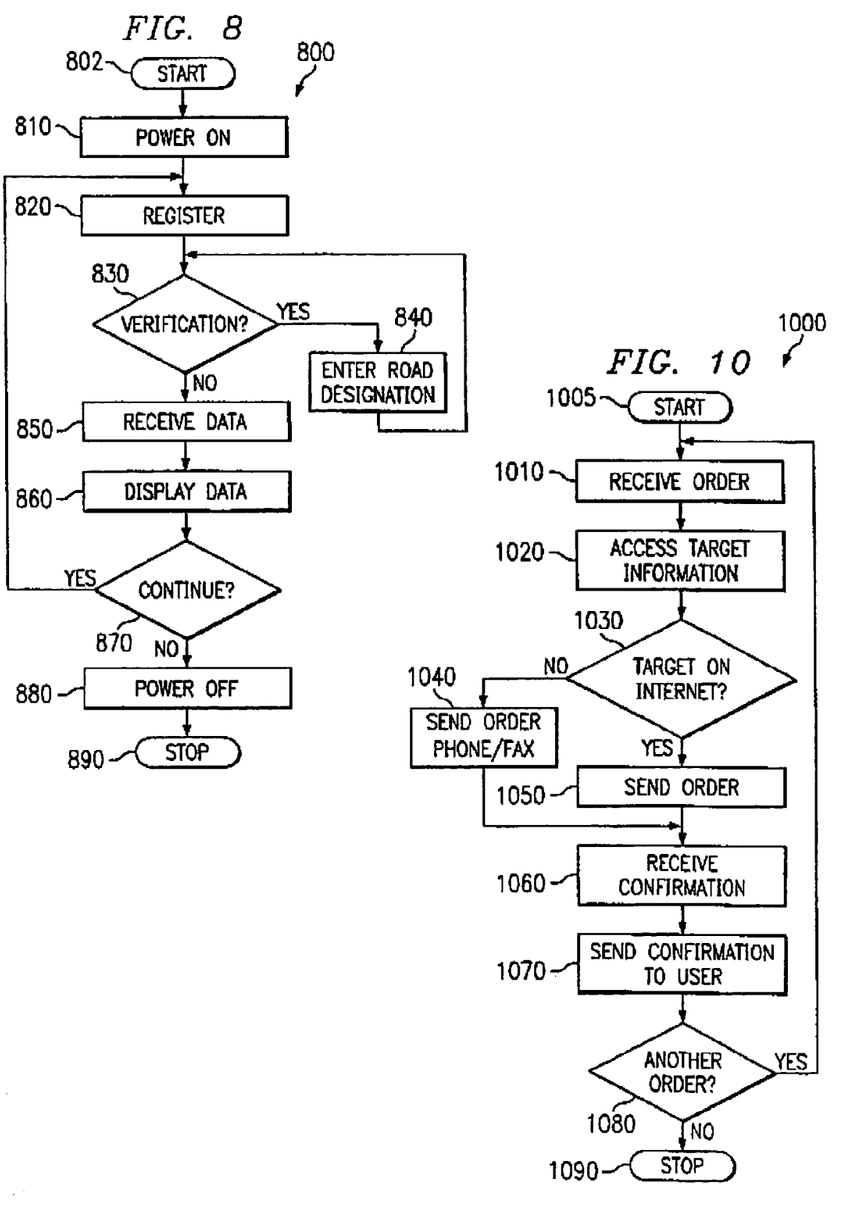
FIG. 8 is a flow chart of the WSNS user request process.
FIG. 10 is a flow chart of the WSNS server ordering process.

FIG. 8 is a flow chart of the WSNS user request process. Request process 800 begins (802) and power is turned on (810). The user registers with the WSNS server (820). If necessary, the WSNS server will prompt the user for verification of the road currently being traveled. Such verification may be necessary in urban areas, where road density is high. If GPS is being used, then such verification would probably be unnecessary. Therefore, a determination is made as to whether verification is necessary (830). If verification is necessary, the user will enter the road designation (840) and request process 800 goes to step 830. If verification is not necessary, mobile unit 410 will receive the data (850) and display the data (860). A determination is made as to whether the user wants to continue to receive data (870). If the user desires to continue to receive data, request process 800 goes to step 820. If the user does not desire to continue to receive data, mobile unit 410 powers off (880) and request process 800 ends.

Figure 9:
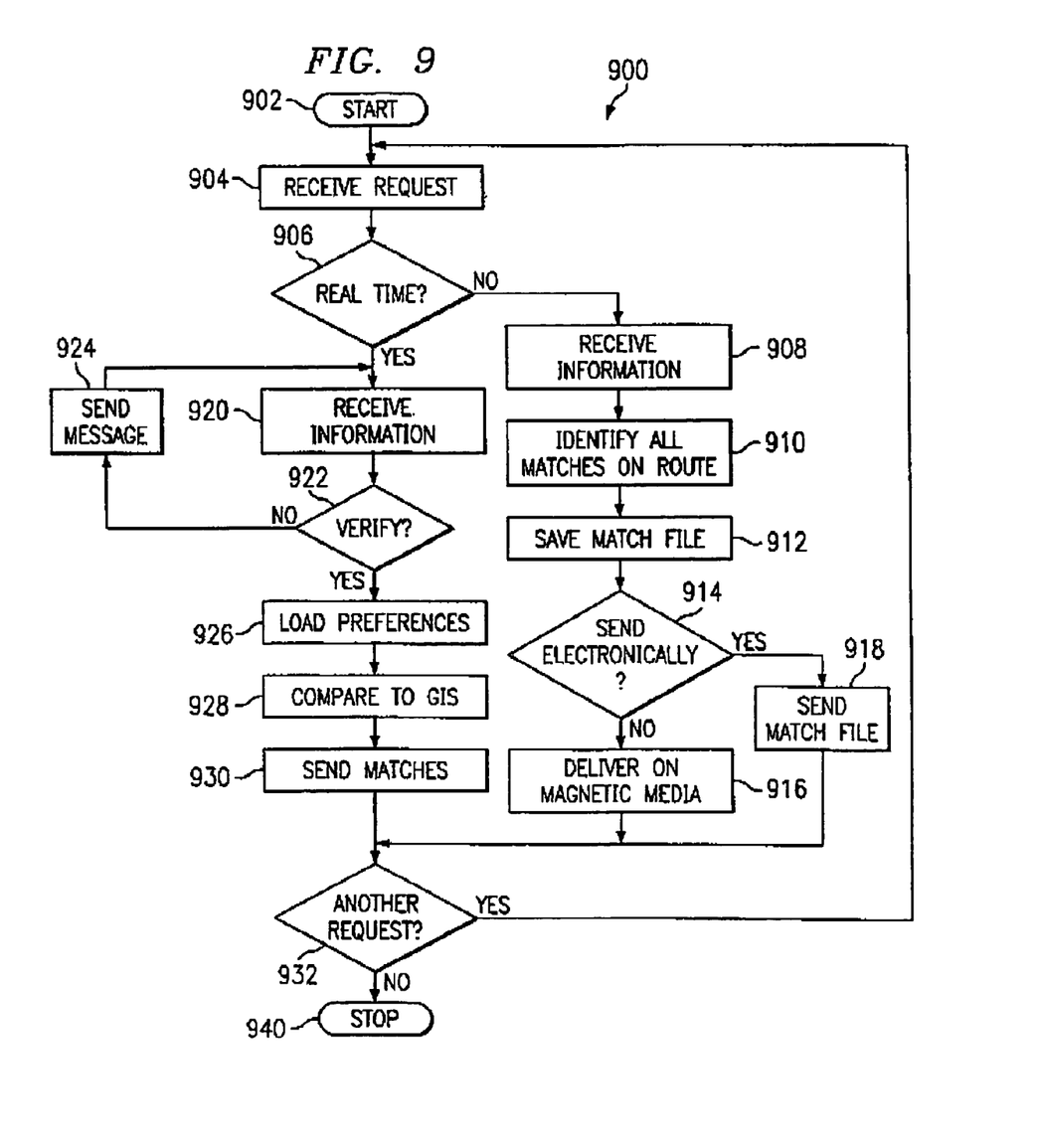
FIG. 9 is a flow chart of the WSNS server request answering process.

FIG. 9 is a flow chart of the WSNS server request answering process 900. Answering process begins (902) and a request is received from a user (904). A determination is made as to whether the request is for an immediate real time response (906). If the request is not for an immediate real time response, then answer process 900 receives the route information from the user (908), identifies all matches on the route (910) and saves the match file (912). A determination is made as to whether to send the match file electronically (914). If the match file is to be sent electronically, then the match file is sent (918) and answer process 900 goes to step 932. If the match file is not to be sent electronically, then answer process 900 will place the match file on magnetic media for delivery by mail (916). If at step 906 a determination is made that the user is requesting immediate information in real time, then the user information is received (920). A determination is made as to whether the user needs to verify the position location (922). If verification is needed, a message is sent (924) and answer process 900 goes to step 920. If verification is not needed, then user preferences are loaded (926). The user position is compared to the GIS table (928). Matches from the GIS table are sent to the user (930). A determination is made as to whether another request is made (932). If another request is made, answer process 900 goes to step 904. If not, answer process 900 ends (940).

FIG. 10 is a flow chart of the WSNS server ordering process 1000. User set up process 700 considered that specific business offerings and prices may be displayed or otherwise conveyed to the customer. Order process 1000 begins (1005). The WSNS server receives an order to be placed with a target business from a user (1010) and accesses target business information (1020). For example, if the target business is a restaurant, the order may be for an amount of food from a menu with prices. If the target business is a hotel, the order may be a room at the rate provided. A determination is made as to whether the target business is on the Internet (1030). If the target business is not on the Internet, the WSNS server sends the order by phone or fax transmission (1040). If the target business is on the Internet, the order is sent by the Internet (1050). Order process 1000 receives confirmation from the target business that the order has been received (1060) and sends confirmation to the user (1070). A determination is made as to whether another order is received (1080). If another order is received, order process 1000 goes to step 1010. If another order is not received, order process ends (1090).

Figure 11:
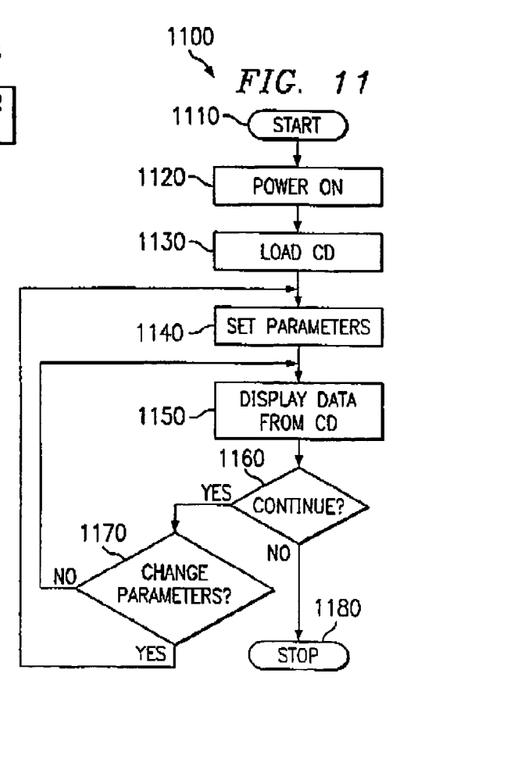
FIG. 11 a flow chart of the WSNS CD-Rom process.

FIG. 11 a flow chart of the WSNS CD-Rom process. CD-Rom process provides pre-travel information. Prior to travel, the user provides the WSNS service provider his or her intended route. The WSNS will provide, through well-known download principles, business contact information which might be found along the route. This download will be placed upon some form of media, ranging from real memory, to flash memory, to traditional physical media types such as CD-RW or diskette, as is readable by the mobile unit. This media will be placed within the mobile unit prior to the trip. Within this implementation, the mobile unit will use positional data, such as that provided by GPS, to track movement relative to a CIS overlay map. The mobile unit will similarly display business information as the traveler moves along the route, achieving an effect similar to that obtained using the full-RF Implementation. CD-Rom process 1100 begins (1110) and power is tuned on (1120). The user loads the CD-Rom in mobile unit 410 (1130). The user enters parameters for the present position into mobile unit 410 and data is displayed from the CD-Rom. A determination is made as to whether the user wants to continue using the CD-Rom (1160). If the user wants to continue using the CD-Rom, a determination is made as to whether the user wants to change the parameters (1170). If the user wants to change the parameters, CD-Rom process 1100 goes to step 1140. If the user does not want to change parameters, CD-Rom process 1100 goes to step 1150. If the user does not want to continue at step 1160, CD-Rom process ends (1180).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A waypoint services navigation system for providing target business information to a mobile user, wherein the target business information includes a target business's identify and the target business's location, and the system comprises:

a wireless network;
a geographic information systems table comprising
    a target business identity field, and
    a target business location field;
a system server computer that
    receives the target business information from a target business computer,
    stores the target business's identify in the target business identify field, and
    stores the target business's location in the target business location field; and
a mobile unit that sends the mobile user's location to the system server computer through the wireless network so that the system server computer compares the mobile user's location with the target business's location stored in the geographic information systems table and transmits the target business information to the mobile unit if the target business location is within a service range of the mobile user's location;
wherein the mobile unit presents the target business information to the mobile user if the system server computer transmits the target business information to the mobile unit.

2. The system of claim 1 wherein the service range is an area circumscribed by a circle having a center co-located with the mobile user's location and a radius configured by the system server computer.

3. The system of claim 1 wherein the service range is restricted to an area circumscribed by a circle having a center co-located with the mobile user's location and a radius entered by the mobile user.

4. The system of claim 1 wherein the service range is an area configured by the system server computer.

5. The system of claim 1 wherein the service range is an area configured by a distance entered by the mobile user.

6. The system of claim 1 wherein the target business information further includes an advertisement, the geographic information systems table further comprises a target business advertisement field, and the system server computer stores the advertisement in the target business advertisement field so that the system server computer transmits the advertisement to the mobile unit if the target business location is within the service range of the mobile user's location.

7. The system of claim 1 wherein the mobile unit further receives payment data from the mobile user and transmits the payment data to the system server computer.

8. The system of claim 1 wherein the mobile unit further comprises a display screen, and the mobile unit presents the target business information on the display screen.

9. The system of claim 1 wherein the mobile unit further comprises a Global Positioning System transceiver for determining the mobile unit's coordinates in the Global Positioning System, and the mobile unit transmits the mobile unit's coordinates in the Global Positioning System as the mobile user's location.

10. A computer implemented process for providing target business information to a mobile unit, the target business information comprising a target business's identify and location, the process comprising: receiving the target business information from the target business;
    entering the target business information into a geographic information systems table;
    receiving the mobile unit'S location over a wireless network;

comparing the mobile unit's location with the target business's location stored in the geographic information systems table;

transmitting the target business information to the mobile unit if the target business location is within a service range of the mobile unit's location; and presenting the target business information on the mobile unit if the target business information is transmitted to the mobile unit.

11. The computer implemented process of claim 10, wherein the target business information further comprises an offer to sell a product or service, and the process further comprises:

placing an order for the product or service from the target business over the wireless network; and transmitting payment data to the target business over the wireless network.

12. The computer implemented process of claim 10, wherein the target business information further comprises an advertisement, and the process further comprises:

transmitting the advertisement to the mobile unit if the target business location is within the service range of the mobile unit's location.

13. The computer implemented process of claim 11 further comprising transmitting the order to the target business.

14. A waypoint services navigation system for providing target business information to a mobile user, wherein the target business information comprises an identity of a target business and a location of the target business, the system comprising: a geographic information system table comprising an identity field and a location field;

a system server computer;

a mobile unit;

a wireless network;

means for registering the target business information in the system server computer so that the target business identity is stored in the identify field of the geographic information system table and the location is stored in the location field of the geographic information system table;

means for transmitting a request for information from the mobile unit to the system server computer;

means for transmitting the mobile unit's location concurrently with the request for information so that the system server computer compares the mobile unit's location with the target business location stored in the geographic information system table and transmits the target business information over the wireless network to the mobile unit if the target business location is within a service range of the mobile unit's location; and means for presenting the target business information to the mobile user if the system server computer transmits the target business information to the mobile unit.

15. The system of claim 14 further comprising means for advertising the target business information on the mobile unit.

16. The system of claim 14 further comprising:

means for ordering a product or service from the target business; and means for transmitting payment data from the mobile unit to the target business.

17. The system of claim 14 further comprising a user interface means for configuring the mobile unit to limit the service range to an area circumscribed by a circle having a center co-located with the mobile unit's location and a radius entered by the mobile user.

18. The system of claim 14 further comprising a user interface means for configuring the mobile unit to limit the service range to a user-specified distance.

19. The system of claim wherein the means for transmitting the mobile unit's location is a Global Positioning System transceiver.

20. The system of claim 14 wherein the geographic information systems table is stored in a portable medium that is readable by the mobile unit.

21. The system of claim 20 wherein the portable medium is a CD-ROM.

* * * * *

UNITED STATES PATENT AND TRADEMARK OFFICE
CERTIFICATE OF CORRECTION

PATENT NO. : 7,092,724 B2 Page 1 of 1
APPLICATION NO. : 10/171852
DATED : August 15, 2006
INVENTOR(S) : Fellenstein It is certified that error appears in the above-identified patent and that said Letters Patent is hereby corrected as shown below:

Col. 1, line 27: "wit" should be --with--

Col. 6, line 15; delete "590"

Col. 6, line 15: "594" should be --590--

Col. 9, line 37: "CIS" should be --GIS--

Signed and Sealed this

Twenty-eighth Day of November, 2006

JON W. DUDAS
*Director of the United States Patent and Trademark Office*